United States Patent Office 3,539,647
Patented Nov. 10, 1970

3,539,647
AROMATIC GROUP VI–B TRICARBONYLS AND PROCESS FOR PREPARING SAME
Mark Crosby Whiting, Oxford, England, assignor to Ethyl Corporation, New York, N.Y., a corporation of Virginia
No Drawing. Original application Jan. 22, 1960, Ser. No. 4,018, now Patent No. 3,361,780, dated Jan. 2, 1968. Divided and this application Sept. 13, 1967, Ser. No. 695,533
Int. Cl. C07c *43/20*
U.S. Cl. 260—613         7 Claims

ABSTRACT OF THE DISCLOSURE

Aromatic Group VI–B metal tricarbonyl compounds are readily formed from an aromatic compound and the metal carbonyl in polar solvents. Electron-repelling aromatic substituents facilitate the reaction. The aromatic moiety becomes electron deficient and nucleophilic displacement of ring substituents occurs more readily. The aromatic metal carbonyls are thermally decomposed to yield the aromatic compound, the metal carbonyl, and the pyrophoric chromium. Alternatively, the aromatic moiety may be replaced by another pi-electron donor.

---

This application is a division of application Ser. No. 4,018, filed Jan. 22, 1960, now U.S. Pat. No. 3,361,780, which is a continuation-in-part of application Ser. No. 720,083, filed Mar. 10, 1958, now U.S. Pat. No. 3,381,023.

This invention relates to new and improved organometallic compounds and improved methods for their preparation. Further, it relates to novel methods for preparing novel aromatic-Group VI–B metal-tricarbonyl compounds. Still another phase of my invention involves the use of aromatic-Group VI–B metal-tricarbonyl compounds as intermediates in the synthesis of organic compounds.

An object of this invention is to provide novel organometallic compounds and a mode for their preparation. Another object is to provide novel aromatic-Group VI–B metal-tricarbonyl compounds through the means of a novel mode of preparation. Still another object is to provide novel processes for the production of organic compounds by utilizing, as a reaction intermediate, an aromatic-Group VI–B metal-tricarbonyl compound.

It has recently been found that aromatic chromium tricarbonyl compounds can be formed by reacting an aromatic compound and chromium hexacarbonyl. This reaction can be characterized as follows:

$$Ar + Cr(CO)_6 \rightarrow ArCr(CO)_3 + 3CO$$

I have found that the use of a polar solvent in the above reaction greatly facilitates the reaction and results in improved yields of aromatic-chromium-carbonyl complexes. Typical of such solvents are oxygen-containing polar solvents such as tetrahydrofuran, the diethyl ether of ethylene glycol, the diethyl and dibutyl ethers of diethylene glycol, isoamyl alcohol, methyl alcohol, ethyl acetate, amyl acetate, the monomethyl and monethyl ethers of ethylene glycol, and acetic acid. Also included are nitrogen-containing polar solvents such as dimethyl formamide and acetonitrile. Diethylene glycol dimethyl ether (diglyme) was found to be the most suitable polar solvent. This solvent is particularly preferred since it results in greatly enhanced yields of the chromium complexes.

A further facet of my invention is the finding that reaction between an aromatic compound and a Group VI–B metal carbonyl is facilitated by the presence of electron-repelling substituents, such as dimethyl amine, on the aromatic ring. The Group VI–B metals are chromium, molybdenum and tungsten. Other electron repelling ring substituents which will improve the reaction rate are alkoxy radicals such as methoxy, ethoxy and butoxy, substituted and unsubstituted amines, hydroxy radicals and alkyl groups.

The various electron-repelling ring substituents, which may be present as substituents on the aromatic reactant, are groups having a meta sigma constant less than a +0.50. It is found that substituent groups having a meta sigma constant greater than +0.50 tend to destroy the ability of the aromatic molecule to coordinate with the Group VI–B metal in forming an aromatic-Group VI–B metal-tricarbonyl compound. Substituents having a meta sigma constant greater than +0.50 are not present as substituent groups on the aromatic reactants employed in my process.

The meta sigma constant is a term in the Hammett equation which is widely used by organic chemists to determine the reactivity of a given aromatic compound. A precise mathematical definition for the meta sigma constant is as follows:

$$= \log \frac{K'}{K_o'}$$

$K_o'$ is the ionization constant for benzoic acid in aqueous solution at 25° C. $K'$ is the ionization constant for benzoic acid under the same conditions when the benzoic acid is substituted in the meta position with a given substituent group. The sigma constant is, therefore, a measure of the substituent group's effect on the reactivity of the parent aromatic compound.

A table of the meta sigma constants for various substituent groups is presented in "Physical Organic Chemistry," by J. Hine, McGraw Hill Book Company, New York, N.Y. (1956), page 72. Typical of the various substituent groups having a meta sigma constant less than +0.50 are as follows:

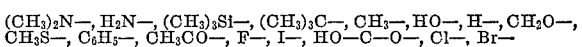
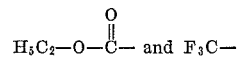

$(CH_3)_2N-$, $H_2N-$, $(CH_3)_3Si-$, $(CH_3)_3C-$, $CH_3-$, $HO-$, $H-$, $CH_2O-$, $CH_3S-$, $C_6H_5-$, $CH_3CO-$, $F-$, $I-$, $HO-C-O-$, $Cl-$, $Br-$ $$H_5C_2-O-\overset{O}{\underset{\|}{C}}- \text{ and } F_3C-$$

As shown by the listing of the various substituent groups having a meta sigma constant less than +0.50, these groups comprise various amines, both substituted and unsubstituted, silyl groups, hydroxyl groups, hydrogen, alkoxy groups, alkylthio groups, aryl groups, alkylcarbonyl groups, halogen groups, acyl groups, ester groups, haloalkyl groups and the like.

Although the use of a polar solvent facilitates reaction between an aromatic compound and a chromium carbonyl, it is found that Group VI–B metal carbonyls will react with an aromatic compound in the presence of a non-polar solvent. The aromatic reactant may also serve as the solvent. When so employed, it is present in excess quantities. Typical non-polar solvents are the high boiling saturated hydrocarbons and silicone oils. Typical hydrocarbons are n-octane, and n-nonane, n-deuane and the various iso-decanes and other paraffinic hydrocarbons having up to about 20 carbon atoms such as eicosane, octadecane, pentadecane and the like. Applicable silicone oils include copolymers and homopolymers of the various organosiloxanes and organosilanes having the appropriate boiling range. Examples of these are the dimethyl polysiloxanes, methylphenyl polysiloxanes, diphenyl polysiloxanes, di(chlorophenyl) polysiloxanes, hexaethyl disilane, hexapropyl disilane, diethyldipropyl-diphenyldisilane and the like.

Typical of the compounds prepared by my process are benzene chromium tricarbonyl, toluene chromium tricarbonyl, o-, m-, and p-xylene chromium tricarbonyl, mesitylene chromium tricarbonyl, hexamethyl benzene chromium tricarbonyl, tetralin chromium tricarbonyl, anisole chromium tricarbonyl, o-cresyl methyl ether chromium tricarbonyl, p-cresyl methyl ether chromium tricarbonyl, aniline chromium tricarbonyl, o-, m-, and p-toluidine chromium tricarbonyl, N-methylaniline chromium tricarbonyl, N,N-dimethyl-o-toluidine chromium tricarbonyl, methyl benzoate chromium tricarbonyl, ethyl phenylacetate chromium tricarbonyl, fluoro-, chloro-, and bromo-benzene chromium tricarbonyl, benzyl alcohol chromium tricarbonyl, acetophenone chromium tricarbonyl, tert-butyl benzene chromium tricarbonyl and mesitylene molybdenum tricarbonyl. Corresponding molybdenum and tungsten compounds are also prepared by my process.

As an example of the improved yields obtainable in the reaction between an aromatic and a chromium carbonyl when using a polar solvent, it was found that use of diethylene glycol dimethyl ether as the solvent in the reaction between toluene and chromium hexacarbonyl resulted in a 80 percent yield of the complex, toluene chromium tricarbonyl, after heating at reflux for five hours. In contrast, when using excess toluene as the solvent in the same reaction, the yield after 12 hours of heating at reflux was 10 percent. Thus, the use of a polar solvent made possible increasing the yield 8-fold while at the same time reducing the reaction time to less than half.

I have found that reaction between an aromatic and chromium hexacarbonyl, when utilizing a polar solvent as described above, is best conducted at a temperature between about 100 to about 180° C. Within this range, yields are generally maximized while undesirable side reactions are minimized. A still further preferred temperature range is between about 140 and about 165° C.

To further exemplify the beneficial effect of a polar solvent on the reaction of an aromatic compound with chromium hexacarbonyl, there are presented the following examples in which all parts and percentages are by weight unless otherwise indicated.

EXAMPLE I

A mixture comprising 66 parts of chromium hexacarbonyl, 352 parts of benzene and 569 parts of dimethyl formamide was heated at reflux under nitrogen for 20 hours. The dark solution was cooled to 10° C. and filtered. Solvents were removed from the filtrate, and the green-yellow residues were extracted with ether and filtered. The ether filtrate was concentrated in volume, and petroleum ether was added thereto to induce crystallization. Forty-five parts of benzene chromium tricarbonyl (having a melting point of 161–163° C.) were obtained in this manner. Concentration of the mother liquors gave an additional five parts of benzene chromium tricarbonyl. The total yield of product was 50 parts or 78 percent based on the quantity of chromium hexacarbonyl used as a reactant.

EXAMPLE II

To about 200 parts of purified dioxane was added 26.6 parts of chlorobenzene and 11 parts of chromium hexacarbonyl. The solution was heated at reflux under nitrogen almost continuously for 170 hours. The solution was then evaporated to dryness, and the residues were recrystallized from isopropyl ether. There was obtained a yield of 4.33 parts (57 percent of theory) of purified chlorobenzene chromium tricarbonyl having a melting point of 97–100° C., and 4.18 parts of chromium hexacarbonyl were recovered.

EXAMPLE III

A total of 11 parts of chromium hexacarbonyl and 8.2 parts of ethyl phenylacetate were added to about 186 parts of a 1:2 mixture (volume ratio) of dioxane and diethylene glycol dimethyl ether. The mixture was refluxed for eight hours at 128° C. (pot temperature). Cooling and filtering yielded 9.5 parts of chromium hexacarbonyl. The resulting solution was evaporated to almost dryness; low-boiling petroleum ether was added, and the mixture was cooled to yield 1.9 parts of ethyl phenylacetate chromium tricarbonyl. This constitutes a yield in excess of 95 percent. The purified melting point of the product was 46.5 to 47.5° C.

In all of the preceding examples, I through III, the use of polar solvents, as illustrated, give superior yields of product. When the above reactions are carried out in the presence of non-polar organic solvents, the yields are reduced.

The characteristic properties of functional substituents are largely preserved in the aromatic-Group VI–B metal complexes. For example, hydroxybenzene chromium tricarbonyl can be methylated and acetylated to the anisole and phenylacetate derivatives. Also, the aniline complex can be converted into the acetanilide derivative. This retention of character of the functional group makes possible the preparation of complexes such as benzoic acid chromium tricarbonyl and phenylacetic acid chromium tricarbonyl by alkaline hydrolysis of the corresponding esters.

Thus, 687 parts of methyl benzoate chromium tricarbonyl, 327 parts of potassium hydroxide in 500 parts of water and 15,900 parts of methanol were allowed to stand for 16 hours at room temperature in the dark. The reaction mixture was diluted with water, and the unreacted ester was removed by ether extraction. The aqueous layer was acidified with hydrochloric acid. Isolation with ether yielded 617 parts of benzoic acid chromium tricarbonyl. Calculated analysis (percent): C, 46.5; H, 2.35. Found (percent): C, 46.4; H, 2.45.

In another run, 2.3 parts of ethyl phenylacetate chromium tricarbonyl were hydrolyzed with a mixture of one part of potassium hydroxide in one part of water and 15.9 parts of methanol to give 2.03 parts of the compound phenylacetic acid chromium tricarbonyl. The reaction was conducted for 15 hours at 17° C. The calculated analysis for the product was (percent): C, 48.5; H, 3.0. Found (percent): C, 48.35; H, 3.15. The melting point was 134–135° C.

Another facet of my invention involves the discovery that the aromatic moiety, when coordinated with the Group VI–B metal, becomes electron deficient. As a result of being electron deficient, the aromatic moiety undergoes nucleophilic displacement of substituents from the ring much more easily than does the parent aromatic compound. Applicable nucleophilic reagents are those of intermediate reactivity such as alkali metal alkoxides, aryloxides and hydroxides. Typical of these reagents are sodium methoxide, potassium ethoxide, sodium phenoxide, potassium butoxide, sodium isopropoxide and sodium hydroxide.

Typical examples of nucleophilic substitution on the aromatic moiety are set forth in the following:

EXAMPLE IV

Two hundred thirty-five parts of chlorobenzene chromium tricarbonyl and 212.5 parts of sodium methoxide in 15,900 parts of methanol were heated at reflux for 24 hours. Isolation yielded 207 parts of methoxy benzene chromium tricarbonyl having a melting point of 85.5–86.5° C.

EXAMPLE V

Two and two-tenths parts of p-chloroanisole chromium tricarbonyl, 1.73 parts of sodium methoxide and 44.4 parts of dry tetrahydrofuran were heated at reflux for 29 hours. Isolation yielded 1.42 parts of p-dimethoxy benzene chromium tricarbonyl as bright yellow needles having a melting point of 97.5–99.5° C.

*Analysis.*—Calculated (percent): C, 48.18; H, 3.67; Cr, 18.97. Found (percent): C, 48.2; H, 3.66; Cr, 17.2.

EXAMPLE VI

A mixture of two parts of chlorobenzene chromium tricarbonyl and 10 parts of potassium hydroxide in 40 parts of water were heated at reflux with stirring for 48 hours under a nitrogen atmosphere to yield 0.45 part of hydroxy benzene chromium tricarbonyl. The product was dissolved in carbon tetrachloride and treated with excess bromine in carbon tetrachloride. After washing with water and aqueous bisulfite, the organic phase was evaporated to give 0.65 part of 2,4,6-tribromophenol. Reaction with the bromine was conducted to prove the structure of the hydroxy benzene chromium tricarbonyl.

EXAMPLE VII

A solution of 1.83 parts of p-chlorotoluene chromium tricarbonyl and .794 part of sodium ethoxide in 15.8 parts of absolute ethanol were heated under nitrogen at reflux with stirring for 24 hours. The reaction mixture changed in color from yellow to orange within 30 minutes, and at the end of the reflux period it was cloudy and deep red. One hundred parts of water and 71.35 parts of ether were added to the cooled reaction mixtures. The layers were separated and the aqueous phase was extracted twice with 35.7-part portions of ether. The combined ether extracts were washed twice with a dilute ammonium chloride solution, dried over magnesium sulfate and concentrated in vacuo. Crystallization of the residue from isopropyl ether gave 0.9 part of p-ethoxy toluene chromium tricarbonyl. Concentration of the mother liquors gave an additional 0.26 gram of product. The total crude yield of product was thus 62 percent based on the starting p-chlorotoluene chromium tricarbonyl. The product was recrystallized from isopropyl ether two more times to give a very pure product in the form of yellow prisms having a melting point of 71.5–73.5° C. The calculated analysis for the product was (percent): C, 52.94; H, 4.44; Cr, 19.11. Found (percent): C, 53.0; H, 4.53; Cr, 19.5.

EXAMPLE VIII

About 82 parts of liquid ammonia were charged to a reaction vessel equipped with a condenser and ammonia inlet tube and an addition funnel. A small quantity of ferric chloride was added to the liquid ammonia followed by 0.368 part of sodium which had been cut into small pieces. A grey suspension of sodium amide formed rapidly and after the sodium had been completely consumed, 1.87 parts of phenylacetonitrile was added drop-wise over a ten-minute period. After stirring for 15 minutes, 17.5 parts of o-xylene and 3.5 parts of ether were added drop-wise while the ammonia evaporated. The last traces of ammonia and ether were distilled off by heating the reaction vessel slightly. Two parts of chlorobenzene chromium tricarbonyl were added to the reaction vessel all at once under a stream of nitrogen, and the mixture was allowed to reflux for two hours under nitrogen. The mixture was cooled, and 50 parts of water were added. The aqueous phase was extracted twice with ether, and the combined ether extracts were washed twice with water, dried over magnesium sulfate and concentrated in vacuo to give an orange oil. The addition of a mixture of isopropyl ether and petroleum ether gave, on cooling, a total of 0.97 part of yellow crystals having a melting point of 52–62° C. Several recrystallizations from the same solvent gave a small yield of pure white crystals of diphenylacetonitrile having a melting point of 74–75° C. The product's authenticity was further established by means of a mixed melting point with an authentic sample of diphenylacetonitrile.

Example VIII illustrates the preparation of an organic compound through use of an organometallic intermediate which on decomposition yields the organic compound. The intermediate product was diphenylacetonitrile chromium tricarbonyl which formed from the reaction of chlorobenzene chromium tricarbonyl and sodium phenylacetonitrile and decomposed to yield diphenylacetonitrile. To verify the fact that formation of diphenylacetonitrile proceeded via the organometallic intermediate diphenylacetonitrile chromium tricarbonyl, reaction was attempted between the sodium salt of phenylacetonitrile and chlorobenzene. Significantly, no diphenylacetonitrile was obtained. This clearly proves that formation of the organometallic compound, diphenylacetonitrile chromium tricarbonyl, is essential to the ultimate formation of diphenylacetonitrile through direct displacement of chlorine from the benzene ring with the phenylacetonitrile anion.

The fluoro-substituted aromatic-Group VI–B metal-tricarbonyl compounds form a preferred species of aromatic metal complexes on which to perform nucleophilic substitution. This is so because it is found that the substitution reaction occurs much more readily with the fluoro-substituted aromatic-metal complex than with either of the aromatic-metal complexes. For example, it has been observed that nucleophilic substitution of the fluoro-aromatic metal complex proceeds at a rate in the order of 1,000 times that of the chloro-substituted aromatic-metal complex.

A further facet of my invention is the regeneration of the aromatic compound from the aromatic-metal complex. This may be accomplished in many cases by thermal decomposition of the aromatic-metal complex. Thus, it has been found that thermal decomposition of the toluene chromium tricarbonyl complex proceeds smoothly at about 200° C. giving a mixture of toluene, chromium hexacarbonyl and pyrophoric chromium.

Further illustration of thermal decomposition of an aromatic-Group VI–B metal-tricarbonyl compound to regenerate the aromatic moiety is presented in the following example.

EXAMPLE IX

A solution comprising two parts of o-toluidine chromium tricarbonyl in 71 parts of ether was heated at reflux by two sun lamps which emitted ultraviolet light. The heating continued for 16 hours after which the muddy-green solution was filtered, and the filtrate was treated with hydrochloric acid to yield o-toluidine·HCl.

In many instances, I prefer to displace the aromatic component from the metal complex by reaction of the complex with a more powerful ligand. Thus, a preferred species of my invention involves the regeneration of the aromatic component by reacting the metal complex with a p-electron donor. A p-donor may be defined as an entity having two or more unshared electrons which may interact with the metal to form a bond. Preferred p-donors for use in displacing the aromatic component are pyridine, dimethylphenylarsine and triphenylphosphine.

Typical reactions of p-donors with the aromatic Group VI–B metal complex are shown by way of the following examples:

EXAMPLE X

A mixture of 293 parts of methylbenzene chromium tricarbonyl and 117 parts of dimethylphenylarsine was heated at a temperature of 150–160° C. for one hour. Isolation gave 358 parts of tris-(dimethylphenylarsine) chromium tricarbonyl as bright yellow prisms having a melting point of 98–100° C. Methylbenzene is regenerated as a result of the reaction.

EXAMPLE XI

A mixture of 3,020 parts of triphenylphosphine and 467 parts of methylbenzene chromium tricarbonyl were slowly heated to 160° C. and maintained at that temperature for two hours. The resulting deep-red solution was cooled. The volatile components of the solution were taken off into a trap (acetone-CO$_2$) at 12 mm. The residue was recrystallized twice from chloroform to yield 971 parts of solvated bis-(triphenylphosphine) chromium tetracarbonyl having a melting point of 175–176.8° C. Methylbenzene is regenerated in the course of the reaction.

EXAMPLE XII

A mixture comprising 131 parts of 1,2,3,4-tetrahydronaphthalene chromium tricarbonyl and 982 parts of pyridine were heated at reflux for one hour. The red solution was cooled and diluted with ether and a brown precipitate was filtered off. The precipitate was a pyridine chromium carbonyl complex. The filtrate was run through a Fenske column in which the solvent was removed. The residue was co-distilled with ethanol at 0.02 mm. into a cold trap. Ultra-violet absorption showed the presence of 27.3 parts of tetralin in the distillate.

EXAMPLE XIII

A stirred mixture comprising two parts of chlorobenzene chromium tricarbonyl, 24.6 parts of cyclohexylamine, 2.2 parts of potassium carbonate and 0.2 part of cupric oxide was heated at reflux under a nitrogen atmosphere for 6.5 hours. The mixture became very dark at first, and then there was obtained a light-yellow, very dense precipitate. The settling of this precipitate made magnetic stirring very difficult. The reaction mass was then cooled and filtered rapidly. The yellow solid, which separated, was dried and stored under nitrogen. It was soluble in benzene and dilute hydrochloric acid and insoluble or slightly soluble in chloroform, carbon tetrachloride, ethyl ether and water. The air-sensitive product was clearly identified as tris-(cyclohexylamine) chromium tricarbonyl. There is also obtained a good yield of chlorobenzene.

EXAMPLE XIV

A stirred solution comprising two parts of benzene chromium tricarbonyl in 24.6 parts of cyclohexylamine was heated to reflux under a nitrogen atmosphere for 1.5 hours. There was obtained a heavy yellow precipitate, which was rapidly filtered after cooling the reaction mixture. The yellow product was dried and stored under nitrogen and constituted 4.05 parts or a 67 percent yield of tris-(cyclohexylamine) chromium tricarbonyl. There is also obtained a good yield of benzene.

A further facet of my invention involves the overall process of:

(1) Reacting an aromatic compound with a Group VI–B metal carbonyl to form the aromatic-Group VI–B metal-carbonyl complex. If the metal is chromium, the reaction is preferably carried out in the presence of a polar solvent.

(2) Performing a nucleophilic displacement reaction on the electron deficient aromatic ring which is coordinated with the metal.

(3) Regenerating the substituted aromatic from the aromatic-metal complex. The latter step may be performed by thermal decomposition of the metal complex. It is preferable, however, to regenerate the aromatic compound by displacing it with another ligand. A preferred ligand for regenerating the aromatic is carbon monoxide since it also regenerates the Group VI–B metal-carbonyl used in Step (1) of the overall process. The regenerated Group VI–B metal-carbonyl can then be recycled so as to form additional aromatic-Group VI–B metal-carbonyl compounds.

An example of my overall process is as follows:

EXAMPLE XV

To 207.1 parts of purified dioxane were added 26.6 parts of chlorobenzene and 11 parts of chromium hexacarbonyl. The solution was refluxed under nitrogen for 170 hours. The reaction mixture was then evaporated to dryness and the residue was recrystallized from isopropyl ether to yield 4.33 parts of chlorobenzene chromium tricarbonyl having a melting point of 97–100° C.

Two parts of the chlorobenzene chromium tricarbonyl, two parts of sodium hydroxide and 60 parts of distilled water were charged to a pressure vessel. The vessel was heated to 120° C. and maintained at that temperature for seven hours after which the vessel was allowed to cool gradually. After cooling, the vessel was opened and 8.04 parts of 48 percent HBr were added. The vessel was then sealed and pressurized with carbon monoxide to a pressure of 800 p.s.i.g. The temperature was brought to 150° C. and held there for one and one-half hours. The vessel was cooled and the reaction product comprising phenol, chlorobenzene, and chromium hexacarbonyl was removed. The reaction mixture was filtered and .09 was of phenol was separated from the filtrate to give a yield of 12 percent of phenol based on the chlorobenzene chromium tricarbonyl. The residue comprising 1.2 parts of chromium hexacarbonyl is admixed with dioxane and recycled to react with chlorobenzene to form chlorobenzene chromium tricarbonyl.

A further example showing the last step in my overall process is the reaction of o-toluidine chromium tricarbonyl with carbon monoxide to regenerate o-toluidine and also chromium hexacarbonyl.

EXAMPLE XVI

A solution comprising 4.86 parts of o-toluidine chromium tricarbonyl dissolved in 53.3 parts of tetrahydrofuran was charged to a reaction vessel. The vessel was flushed with nitrogen and pressurized to 850 p.s.i.g. with carbon monoxide. After solubility take-up, the reaction vessel was slowly heated to 180° C. At 120° C. gas take-up had begun, and at 134° C. a definite pressure drop was observed. The reaction vessel was maintained at 180° C. for 45 minutes after which it was cooled. The reaction vessel was discharged, and the muddy-green reaction product was filtered. A total of 3.87 parts (88 percent) of dried chromium hexacarbonyl was isolated. The filtrate was evaporated and the residue was dissolved in petroleum ether. Hydrogen chloride was then bubbled through the solution, and the resulting precipitate was dried and recrystallized from a methanol-ether mixture. A mixed melting point clearly identified the product as o-toluidine·HCl. The yield was 2.67 parts or 94 percent of theory.

Further studies of the reaction between carbon monoxide and an aromatic-Group VI–B metal-tricarbonyl show that the temperature at which the reaction is run has a considerable effect on the yield obtained. Thus, when reacting anisole chromium tricarbonyl with carbon monoxide at temperatures of 100° C. and 150° C., it is observed that the reaction goes much better at 150° C. For this reason I generally prefer a reaction temperature in the vicinity of 150° C.

To further illustrate my overall process, there is presented the following example illustrating preparation of p-dimethoxy benzene.

EXAMPLE XVII

A mixture comprising 2.2 parts of p-chloroanisole chromium tricarbonyl, 1.73 parts of sodium methoxide and 44.4 parts of dry tetrahydrofuran was heated at reflux for 29 hours. The reaction product was concentrated in vacuo to a small volume; water was added, and the mixture was extracted several times with ether. The combined ether extracts were washed twice with water, dried over magnesium sulfate and concentrated in vacuo to give a residue. The residue was dissolved in isopropyl ether, and the solution was cooled to crystallize 0.84 part of p-dimethoxybenzene chromium tricarbonyl as bright-yellow needles having a melting point of 97.5–98° C. Concentration of the mother liquors gave an additional 0.58 part of product having a melting point of 90–93° C. (total yield of 66 percent). An analytical sample was obtained from an additional recrystallization which had a melting point of 97.5–99.5° C. On analysis, there was found (percent): C, 48.2; H, 3.66 and Cr, 17.2. Calculated for $C_{11}H_{10}O_5Cr$ (percent): C, 48.18; H, 3.67 and Cr, 18.97.

A solution comprising 0.9 part of the prepared p-dimethoxybenzene chromium tricarbonyl in 44.4 parts of tetrahydrofuran was charged to an autoclave. After flushing with nitrogen, the autoclave was pressurized to 800 p.s.i.g. with carbon monoxide and heated to 180° C. for one hour. The total carbon monoxide taken up amounted to a pressure drop of 75 p.s.i.g. The autoclave was cooled and vented, and the green reaction mass was washed with acetone through a Celite filter to give a nearly colorless filtrate. To the nearly white crystalline residue which resulted from concentration of the filtrate was added a small amount of cold ether. Filtration gave 0.24 part (33 percent yield) of chromium carbonyl. The filtrate was concentrated to dryness by heating in vacuo to give 0.34 part (75 percent yield) of p-dimethoxybenzene as thin cream-colored flakes having a melting point of 42.5–46.5° C. Recrystallization from petroleum ether gave white flakes having a melting point of 52–54° C. The infrared spectrum of the product is identical with the Satler spectrum of p-dimethoxybenzene.

The compounds of my invention can be used in forming metallic mirrors comprising a layer or coating of chromium on a substrate material. These mirrors are formed by thermally decomposing one of the compounds of my invention at a temperature above 400° C. On the decomposition of the compound, chromium deposits on adjacent surfaces to form thereon a metallic mirror. These mirrors have the useful and desirable property of protecting the base material against corrosion. Also, they can be used to decorate the base material as by applying the mirror to a base material that is covered by a stencil. The compounds of the present invention can be deposited on glass, glass cloth, resins and other insulating supports. It is preferred that inert gases, e.g. argon, be used to protect the base material from oxidation during the mirror-forming operation.

Deposition on glass cloth illustrates one form of the applied processes. A glass cloth band weighing one gram is dried for one hour in an oven at 150° C. Then together wtih 0.5 gram of benzene chromium tricarbonyl, it is enclosed in a glass tube devoid of air and heated at 400° C. for one hour, after which time the tube is cooled and opened. The cloth has a uniform metallic appearance and exhibits a gain in weight of about 0.02 gram. The cloth has decreased resistivity and each fiber is a conductor. Application of current to the cloth causes an increase in its temperature. Thus, a conducting cloth has been prepared. The cloth can be used to reduce static electricity, for decoration, for thermal insulation by reflection, and as a heating element.

The compounds of my invention have further utility as additives to residual and distillate fuels generally, e.g. jet fuels, home heater fuels and diesel fuels, to reduce smoke and/or soot. Further, they are excellent antiknocks when used in fuels and are lubricity improvers when used in lubricating oils. My compounds, when used as antiknocks, may be used alone or in combination with other additives such as scavengers, deposit-modifying agents containing phosphorus or boron and in combination with other antiknock agents such as tetraethyllead. They may be used in fuels containing up to about eight grams of lead antiknock per gallon.

When present in a liquid hydrocarbon fuel used in a spark ignition internal combustion engine, my compounds may be present in a concentration range from about 0.05 to about 10 grams of a group VI–B metal per gallon. A preferred concentration range is from about 1.0 to about six grams of a Group VI–B metal per gallon of fuel.

My compounds can be added directly to the hydrocarbon fuels or lubricating oils after which the mixture is agitated until a homogeneous fluid results. Also my compounds may be first blended into concentrated fluids containing solvents such as kerosene, antioxidants and other antiknock agents such as tetraethyllead. The concentrated fluid can then be blended with a hydrocarbon base material to form a fuel particularly adapted for use in a spark ignition internal combustion engine. When my compounds are employed in a concentrated fluid in combination with lead, my compound are present in an amount so that for each gram of lead present there is a sufficient quantity of one or more of my compounds to give between about 0.008 to about 10 grams of a Group V–B metal. A preferred range comprises from about 0.01 to about six grams of a Group VI–B metal as a compound of the instant invention for each gram of lead as an organolead compound.

The scavengers employed in combination with my compounds are either phosphorus compounds or halohydrocarbons. The halohydrocarbon scavengers can be either aliphatic or aromatic with the halogen atoms being attached to carbon atoms either in the aliphatic or aromatic portion of teh molecule. The scavenger compounds may also contain carbon, hydrogen and oxygen such as, for example, haloalkyl ethers, halohydrins, haloesters, halonitro compounds and the like. When used in forming an antiknock fluid, the atom ratio of metal to halogen ranges from about 50:1 to about 1:12. The halohydrocarbon scavengers normally contain from about two to about 20 carbon atoms in the molecule.

When a phosphorus scavenger is employed with my compounds in formulating an antiknock fluid, it can be present in an amount between about 0.01 to about 1.5 theories of phosphorus. A theory of scavenger is that amount of scavenger which will react completely with the metal present in the antiknock mixture. Reaction between a halide scavenger and lead gives the lead dihalide. Thus, a theory of halogen scavenger represents, in the case of lead, two atoms of halogen for each atom of lead. A phosphorus scavenger reacts with lead to form lead ortho-phosphate, $Pb_3(PO_4)_2$. Thus, a theory of phosphorus represents, in the case of lead, an atom ratio of two atoms of phosphorus to three atoms of lead. Theories of phosphorus or halochydrocarbon scavengers of other metals are computed in the same manner by stoichiometric calculations.

Further, my compounds may be incorporated in paints, varnish, printing inks, synthetic resins of the drying oil type, oil enamels and the like to impart improved drying characteristics to such compositions. Another important utility of my compounds are their use as chemical intermediates in the preparation of metal-containing polymeric materials.

The organic compounds produced by my novel process utilizing an aromatic-Group VI–B metal-tricarbonyl compound as an intermediate have all the utilities possessed by organic compounds generally. Thus, they may be used in dyes, antioxidants, medicinals, functional fluids, resins, polymers, etc.

Having fully defined the novel compounds of my invention, their novel mode of preparation and their manifold utilities, I desire to be limited only within the lawful scope of the appended claims.

I claim:

1. Process comprising reacting a halogen substituted aromatic compound with a Group VI–B metal carbonyl, said reaction being carried out in the presence of a polar solvent, to form an aromatic Group VI–B metal-carbonyl complex, reacting said aromatic Group VI–B metal-carbonyl complex with a nucleophilic reagent which is a member selected from the group consisting of alkali metal alkoxides, alkali metal aryloxides and alkali metal hydroxides so as to form an aromatic-Group VI–B metal-carbonyl compound in which the halogen on the aromatic moiety is replaced by the nucleophile, and regenerating the nucleophile-substituted aromatic compound by displacing it from the aromatic-Group VI–B metal-carbonyl complex with carbon monoxide at a temperature of from about 100 to about 180° C.

2. Process of claim 1 wherein said displacing is carried out at a pressure of from about 800 to about 850 p.s.i.g.

3. Process of claim 2 wherein said polar solvent is selected from tetrahydrofuran and dioxane.

4. The process of claim 3 wherein said polar solvent is tetrahydrofuran.

5. The process of claim 4 wherein said temperature is about 180° C. and said pressure is about 800 p.s.i.g.

6. The process of claim 5 wherein the Group VI-B metal corbonyl compound formed on reaction of carbon monoxide with the nucleophile-substituted aromatic-Group VI-B metal-carbonyl compound is recycled so as to react with an aromatic compound and form an aromatic-G VI-B metal-carbonyl compound.

7. Process of claim 1 wherein said polar solvent is selected from tetrahydrofuran and dioxane.

References Cited

UNITED STATES PATENTS 2,916,503  12/1959  Kozikowski ____ 260—438.5 XR

OTHER REFERENCES

Fischer et al.: Chem. Ber., vol. 90 (1957), pp. 2532–2535.

Nicholls et al.: Jour. Chem. Soc. (London) (1959), pp. 551–556.

BERNARD HELFIN, Primary Examiner

U.S. Cl. X.R.

260—612, 613

UNITED STATES PATENT OFFICE
CERTIFICATE OF CORRECTION

Patent No. 3,539,647 November 10, 1

Mark Crosby Whiting

It is certified that error appears in the above identified patent and that said Letters Patent are hereby corrected as shown below:

Column 2, line 41, "$CH_2O-$" should read -- $CH_3O-$ --; line "$HO-C-O-$" should read -- $HO-\overset{O}{\underset{\|}{C}}-O-$ --; line 62, "n-deuane" shou read -- n-decane --. Column 8, line 10, "was", second occurre should read -- part --. Column 10, line 9, "V-B" should read -- VI-B --; line 39, "halochydrocarbon" should read -- halo- hydrocarbon --. Column 11, line 14, (Claim 6, line 6), "G" should read -- Group --.

Signed and sealed this 16th day of March 1971.

(SEAL)
Attest:

EDWARD M. FLETCHER, JR.
Attesting Officer

WILLIAM E. SCHUYLER
Commissioner of Pat